US008173569B2

(12) United States Patent
Jorgensen et al.

(10) Patent No.: US 8,173,569 B2
(45) Date of Patent: *May 8, 2012

(54) ROBUST SPRAY-DRIED ZIEGLER-NATTA PROCATALYST AND POLYMERIZATION PROCESS EMPLOYING SAME

(75) Inventors: Robert J. Jorgensen, Scott Depot, WV (US); Michael A. Kinnan, N Canton, OH (US); Michael D. Turner, Hurricane, WV (US); Stephanie M. Whited, Charleston, WV (US); Laszlo L. Ban, Bordentown, NJ (US); Burkhard E. Wagner, Highland Park, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 1024 days.

This patent is subject to a terminal disclaimer.

(21) Appl. No.: 11/632,325

(22) PCT Filed: Jun. 24, 2005

(86) PCT No.: PCT/US2005/022492
§ 371 (c)(1),
(2), (4) Date: Jan. 12, 2007

(87) PCT Pub. No.: WO2006/023057
PCT Pub. Date: Mar. 2, 2006

(65) Prior Publication Data
US 2008/0076951 A1    Mar. 27, 2008

Related U.S. Application Data

(60) Provisional application No. 60/600,082, filed on Aug. 9, 2004.

(30) Foreign Application Priority Data

Jun. 24, 2005 (WO) ..................... PCT/US05/22492

(51) Int. Cl.
C07C 2/02 (2006.01)
C07F 7/28 (2006.01)
C08F 4/44 (2006.01)
B01J 31/14 (2006.01)

(52) U.S. Cl. ........ 502/109; 502/112; 502/104; 502/106; 502/115; 502/132; 526/123.1; 526/124.2; 526/153; 526/160; 526/348; 556/54

(58) Field of Classification Search ..................... None
See application file for complete search history.

(56) References Cited

U.S. PATENT DOCUMENTS
4,293,673 A    10/1981    Hamer et al.
(Continued)

FOREIGN PATENT DOCUMENTS
EP    0629632 A2    12/1994
(Continued)

OTHER PUBLICATIONS
PCT/US2005/022492 Search Report/Written Opinion.
(Continued)

*Primary Examiner* — Melvin Mayes
*Assistant Examiner* — Yun Qian

(57) ABSTRACT

A Ziegler-Natta procatalyst composition in the form of solid particles and comprising magnesium, halide and transition metal moieties, said particles having an average size (D50) of from 10 to 70 μm, characterized in that at least 5 percent of the particles have internal void volume substantially or fully enclosed by a monolithic surface layer (shell), said layer being characterized by an average shell thickness/particle size ratio (Thickness Ratio) determined by SEM techniques for particles having particle size greater than 30 μm of greater than 0.2.

13 Claims, 2 Drawing Sheets

U.S. PATENT DOCUMENTS

| | | |
|---|---|---|
| 4,302,565 A | 11/1981 | Goeke et al. |
| 4,442,276 A | 4/1984 | Kashiwa et al. |
| 4,460,701 A | 7/1984 | Terano et al. |
| 4,482,687 A | 11/1984 | Noshay et al. |
| 4,508,842 A | 4/1985 | Beran et al. |
| 4,540,679 A | 9/1985 | Arzoumanidis et al. |
| 4,543,399 A | 9/1985 | Jenkins et al. |
| 4,547,476 A | 10/1985 | Terano et al. |
| 4,588,790 A | 5/1986 | Jenkins et al. |
| 4,621,952 A | 11/1986 | Aronson |
| 4,728,705 A | 3/1988 | Nestlerode et al. |
| 4,816,433 A | 3/1989 | Terano et al. |
| 4,829,037 A | 5/1989 | Terano et al. |
| 4,927,797 A | 5/1990 | Ewen |
| 4,990,479 A | 2/1991 | Ishimaru et al. |
| 5,028,671 A | 7/1991 | Kioka |
| 5,034,361 A | 7/1991 | Job et al. |
| 5,066,737 A | 11/1991 | Job |
| 5,066,738 A | 11/1991 | Ewen |
| 5,077,357 A | 12/1991 | Job |
| 5,082,907 A | 1/1992 | Job |
| 5,106,806 A | 4/1992 | Job |
| 5,122,494 A | 6/1992 | Job |
| 5,146,028 A | 9/1992 | Job |
| 5,151,399 A | 9/1992 | Job |
| 5,153,158 A | 10/1992 | Kioka et al. |
| 5,229,342 A | 7/1993 | Job |
| 5,247,031 A | 9/1993 | Kioka et al. |
| 5,247,032 A | 9/1993 | Kioka et al. |
| 5,290,745 A | 3/1994 | Jorgensen et al. |
| 5,352,749 A | 10/1994 | DeChellis et al. |
| 5,487,938 A | 1/1996 | Spencer |
| 5,567,665 A | 10/1996 | Wagner et al. |
| 5,589,539 A | 12/1996 | Wagner et al. |
| 5,618,770 A * | 4/1997 | Dath et al. .................. 502/107 |
| 5,652,314 A | 7/1997 | Wagner |
| 6,187,866 B1 | 2/2001 | Jorgensen et al. |
| 6,242,543 B1 | 6/2001 | Follestad et al. |
| 6,248,831 B1 | 6/2001 | Maheshwari et al. |
| 6,300,436 B1 | 10/2001 | Agapiou et al. |
| 6,454,976 B1 | 9/2002 | Neubauer |
| 6,617,405 B1 | 9/2003 | Jorgensen |
| 6,806,221 B2 * | 10/2004 | Wagner et al. ................. 502/103 |
| 7,160,833 B2 * | 1/2007 | Wagner et al. ................. 502/133 |
| 2004/0010100 A1 * | 1/2004 | Wagner et al. ............. 526/123.1 |

FOREIGN PATENT DOCUMENTS

| | | |
|---|---|---|
| EP | 0629632 B1 | 12/1994 |
| EP | 0876406 B1 | 1/1997 |
| WO | WO97/27225 | 7/1997 |
| WO | WO2005/012371 A | 2/2005 |

OTHER PUBLICATIONS

PCT/US2005/022492 International Preliminary Report on Patentability.

* cited by examiner

ROBUST SPRAY-DRIED ZIEGLER-NATTA PROCATALYST AND POLYMERIZATION PROCESS EMPLOYING SAME

CROSS REFERENCE STATEMENT

This application claims the benefit of U.S. Provisional Application No. 60/600,082, filed Aug. 9, 2004.

BACKGROUND OF THE INVENTION

This invention relates to procatalyst compositions, processes for making such compositions, and methods for using such compositions to make polymers. More particularly, the present invention relates to novel Ziegler-Natta procatalyst compositions which in combination with a cocatalyst form catalyst compositions for use in polymerization of olefins.

The properties of polymers substantially depend upon the properties of the catalysts used in their preparation. In particular, the choice of the shape, size, size distribution, and other morphological properties of supported catalysts is important to ensure operability and commercial success. This is particularly important in gas phase and slurry polymerizations. A successful catalyst composition should be based on a procatalyst particle having good mechanical properties including resistance to wear, abrasion and shattering during the polymerization process, thereby imparting good bulk density and uniformity to the resulting polymer product. Equally important are procatalyst compositions that produce such polymer products in high catalyst efficiency.

Spray-drying is a well known technique for preparing solid Ziegler-Natta polymerization procatalysts. In spray-drying, liquid droplets containing dissolved and/or suspended materials are ejected into a chamber under drying conditions to remove solvent or diluent leaving behind a solid residue. The resulting particle size and shape is related to the characteristics of the droplets formed in the spraying process. Structural reorganization of the particle can be influenced by changes in volume and size of the droplets. Depending on conditions of the spray drying process, either large, small, or aggregated particles can be obtained. The conditions may also produce particles that are compositionally uniform or contain voids or pores. The use of inert fillers in forming spray-dried particles can help control shape and composition of the resulting particles.

Numerous spray-dried olefin polymerization procatalysts containing magnesium and titanium and production processes for making and utilizing them have been reported. Examples include U.S. Pat. No. 6,187,866; U.S. Pat. No. 5,567,665; U.S. Pat. No. 5,290,745; U.S. Pat. No. 5,122,494; U.S. Pat. No. 4,990,479; U.S. Pat. No. 4,508,842; U.S. Pat. No. 4,482,687; and U.S. Pat. No. 4,302,565. Generally, such compositions have been produced in the form of substantially spheroidal shaped solid procatalyst particles having average particle diameters from 1 to 100 μm, depending on the intended end use. Porosity and cohesive strength of the particles can be adjusted by the use of fillers, such as silica, and binders, such as polymeric additives. Generally, solid rather than hollow particles are desired due to greater structural integrity of the resulting particles. Disadvantageously however, solid particles tend to have lower productivities or efficiencies due to the fact that interior regions of the procatalyst particle are not able to effectively come into contact with the cocatalyst or monomer or to otherwise participate in the polymerization process as readily as surface regions of the particle.

Despite the advance in the art obtained by the foregoing disclosures, there still remains a need to produce Ziegler-Natta procatalysts having improved performance properties. Procatalyst compositions having increased resistance to shattering and generation of polymer fines are highly desired. Generation of polymer fines is undesirable due to buildup in the polymerization equipment, thereby causing problems with bed level control and entrainment in the cycle gas leading to equipment failure, impaired operability, and reduced efficiency. High levels of fines can also cause problems in downstream handling of the polymer once it exits the polymerization system. Fines can cause poor flow in purge bins, plug filters in bins, and present safety problems. The above problems make elimination or reduction of polymer fines important to commercial operation, especially of a gas-phase polymerization process.

In a multiple series reactor system, where the composition of the polymers produced in the separate reactors is widely variable, the presence of polymer fines is particularly harmful to continuous and smooth operation. This is due to the extreme importance of precise bed level control, in as much as the product properties of the final polymer are strongly influenced by the relative amount of polymer produced in each reactor. If the bed weights are not precisely known, it is extremely difficult to properly control the final product properties.

With respect to the preparation of polyethylene and other ethylene/α-olefin copolymers, it is preferred to produce polymer in the separate reactors with both large molecular weight differences and relatively large differences in incorporated comonomer. To produce final polymers with the best physical properties, it is preferred to have one of the reactors produce a polymer with high molecular weight and incorporating a majority of any comonomer present. In the second reactor, a low molecular weight portion of the polymer is formed which may also have comonomer incorporated, but normally in an amount less than that incorporated in the high molecular weight portion. When the high molecular weight component is produced first, polymer fines can become a significant problem, especially when the flow index (I21, ASTM D-1238, condition 190/2.16) of the resulting polymer is in the range from 0.1 to 2.0 g/10 min, and the incorporated comonomer content is less than 5 weight percent, especially less than 4.5 wt weight percent.

Depending on the order of production of the different polymers in the multiple reactor system (that is production of high molecular weight polymer first and lower molecular weight polymer second or vice versa), the fines will tend to have significantly different polymer properties than the bulk of the polymer granules. This is believed to be due to the fact that the fines also tend to be the youngest particles in the reactor and hence they do not achieve conformation to the final product properties before transiting to the second reactor in series.

This in turn leads to further problems in compounding the polymer into pellets for end-use. In particular, the fines are normally of significantly different molecular weight or branching composition compared to the remainder or bulk polymer. Although the particles of both the bulk material and the fines will melt at roughly the same temperature, mixing is hampered unless the products have a similar isoviscous temperature (that is the temperature at which the melt viscosity of the two products is essentially the same). These polymer fines, which tend to be of significantly different molecular weight and isoviscous temperature than the remainder of the polymer, are not readily homogeneously mixed with the bulk phase, but rather form segregated regions in the resulting polymer pellet and can lead to gels or other defects in blown films or other extruded articles made therefrom.

Thus, generation of polymer fines is a problem, especially for gas phase olefin polymerization processes and, in particular, for staged or series reactor systems in which precise control of polymer composition is only achieved by precise control of the relative amount of polymer produced in the multiple reactors.

Accordingly, it is desirable to minimize polymer fines in an olefin polymerization process. One factor in reducing such polymer fines is by eliminating or reducing those procatalyst particles that are susceptible to the production of polymer fines due to fractioning or abrasion. To that end, one object of the invention is to provide an improved catalyst with greater mechanical strength that results in reduced polymer fines while, at the same time, possessing good polymerization response and efficiency.

SUMMARY OF THE INVENTION

The aforementioned need is fulfilled by one or more aspects of the invention disclosed herein. In one aspect, the invention comprises substantially spheroidal shaped particles of a magnesium halide containing procatalyst composition, said particles having an average size (D50) of from 10 to 70 μm, preferably 15 to 50μ, and most preferably from 20 to 35 μm, and comprising at least 5 percent, preferably at least 20 percent and most preferably at least 25 percent of particles having substantial internal void volume and a substantially monolithic surface layer (shell) characterized by an average shell thickness/particle size ratio (Thickness Ratio) determined by SEM techniques for particles having particle size greater than 30 μm of greater than 0.2, preferably greater than 0.25.

In another aspect, the invention relates to a method for making the foregoing procatalyst composition, the steps of the method comprising: a) providing a liquid composition comprising i) a magnesium halide compound, ii) a solvent or diluent, iii) a transition metal compound wherein the transition metal is selected from the metals of Groups 3-10 and Lanthanides of the Periodic Table of the Elements, iv) optionally an internal electron donor, and v) further optionally a filler; b) spray-drying the composition to form a spray-dried particle; and c) collecting the resulting solid particles, characterized in that the magnesium halide compound forms a substantially saturated solution in the solvent or diluent.

In still another aspect, the invention relates to a process for making a polymer comprising contacting at least one olefin monomer with the foregoing procatalyst or with a procatalyst made by the foregoing method, and a cocatalyst under olefin polymerization conditions to form a polymer product.

DETAILED DESCRIPTION

Figure 1:
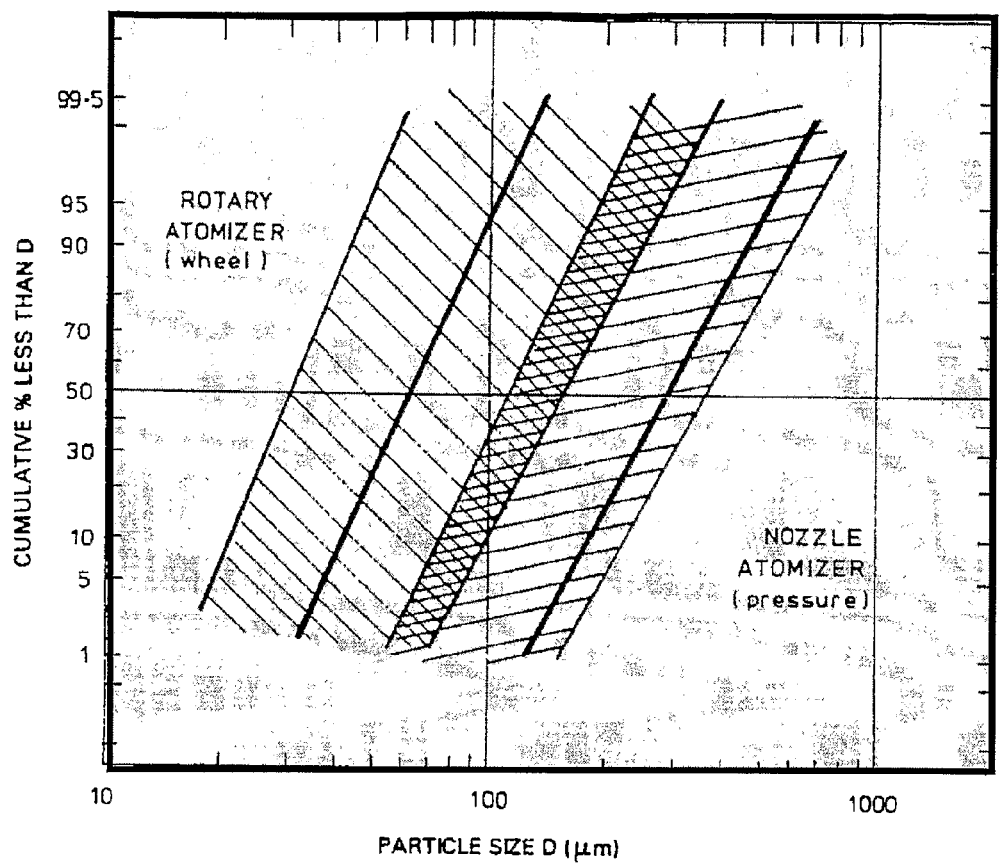
FIG. 1 is a graphical illustration of typical process conditions employed in forming procatalyst particles according to the invention.

All reference to the Periodic Table of the Elements herein shall refer to the Periodic Table of the Elements, published and copyrighted by CRC Press, Inc., 2003. Also, any reference to a Group or Groups shall be to the Group or Groups as reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art. Unless stated to the contrary, implicit from the context, or customary in the art, all parts and percents are based on weight.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

Ziegler-Natta procatalyst compositions can be produced by numerous techniques including physical blending of solid mixtures of magnesium halides with titanium halides or the in situ formation of halogenating agents such as by reducing a titanium halide compound with elemental magnesium. Solid phase forming techniques involve the use of ball-mills or other suitable grinding and comminuting equipment. Precipitation techniques may use repeated halogenations with various halogenating agents, preferably $TiCl_4$ to prepare suitable procatalyst compositions.

Various methods of making procatalyst compositions are known in the art. Included in these methods are those described, inter alia, in: U.S. Pat. Nos. 5,487,938; 5,290,745; 5,247,032; 5,247,031; 5,229,342; 5,153,158; 5,151,399; 5,146,028; 5,106,806; 5,082,907; 5,077,357; 5,066,738; 5,066,737; 5,034,361; 5,028,671; 4,990,479; 4,927,797; 4,829,037; 4,816,433; 4,547,476; 4,540,679; 4,460,701; 4,442,276; and elsewhere. In a preferred method, the preparation involves chlorination of a magnesium compound or mixture of compounds, optionally in the presence of an inert solid material, especially silica, alumina, an aluminosilicate, or similar substance. The resulting compound or complex comprises at least magnesium, halogen, and transition metal moieties, especially titanium or vanadium moieties.

In one embodiment the procatalyst is formed by halogenation of a precursor by reaction with one or more magnesium, halogen and transition metal sources. Suitable sources for magnesium moieties include magnesium metal, anhydrous magnesium chloride, magnesium alkoxides or aryloxides, or carboxylated magnesium alkoxides or aryloxides. Preferred sources of magnesium moieties are magnesium halides, especially magnesium dichloride, as well as magnesium ($C_{1-4}$) alkoxides, especially magnesium compounds or complexes containing at least one ethoxy group. Preferred compositions additionally comprise a transition metal compound, especially titanium compounds. Suitable sources of transition metal moieties include the corresponding ($C_{1-8}$) alkoxides, aryloxides, halides and mixtures thereof. Preferred precursors comprise one or more magnesium ($C_{1-4}$) alkoxide or halide containing compounds and optionally one or more titanium ($C_{1-4}$) alkoxides or halides.

Suitable transition metal compounds other than titanium or vanadium include compounds of other Group 3-8 transition metals, especially zirconium, hafnium, niobium, or tantalum. In certain embodiments, other transition metals, such as later transition metals and Lanthanides, or mixtures of transition and/or Lanthanide metals may be suitable as well.

Preferred transition metal compounds are titanium compounds corresponding to the formula: $Ti(OR^2)_aX_{4-a}$ wherein $R^2$ independently each occurrence is a substituted or unsubstituted hydrocarbyl group having 1 to 25 carbon atoms, preferably methyloxy, ethyloxy, butyloxy, hexyloxy, decyloxy, dodecyloxy, phenyloxy, or napthyloxy; X is halide, preferably chloride, and a may range from 0 to 4. Mixtures of titanium compounds can be employed if desired.

Most preferred transition metal compounds are titanium halides and haloalcoholates having 1 to 8 carbon atoms per alcoholate group. Examples of such compounds include: $TiCl_4$, $TiBr_4$, $TiL_4$, $TiCl_3$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti-(OC_8H_{17})Cl_3$, $Ti(OCH_3)_2Br_2$, $Ti(OC_2Hs)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$.

The quantity of a transition metal compound or mixture of transition metal compounds used in preparing procatalysts of the invention may vary widely depending on the type of procatalyst desired. In some embodiments, the molar ratio of magnesium to transition metal compound may be as high as 56 and as low as 0.5, depending upon the specific catalyst design. Generally, molar ratios of magnesium to transition metal compound from 3 to 10 are preferred. A preferred transition metal is titanium.

Forming a suitable procatalyst composition may be accomplished in any manner. One suitable technique involves mixing of a magnesium halide with a transition metal compound. The components are desirably combined at a temperature ranging from –70 to 200° C. Preferably, the temperature is from 20 to 150° C., most preferably from 25 to 120° C., and should be below the boiling point of any solvent or diluent employed. In some embodiments, the magnesium halide solution and the titanium compound may be mixed 5 minutes to 24 hours. In other embodiments, 30 minutes to 5 hours are sufficient to achieve the desired concentration of magnesium halide. Sufficient mixing is generally attained by the use of mechanical stirring equipment, however ultrasonic sound generators, static mixers, or other suitable devices may be employed to aid in dispersion and mixing, if desired.

A preferred precursor composition for use herein is a mixed magnesium/titanium compound of the formula $MgdTi(OR^e)_eX_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently R', chlorine, bromine or iodine; d is 0.5 to 5, preferably 2-4, most preferably 3; e is 0-12, preferably 0-10, most preferably 0-4; and f is 1-10, preferably 2-8, most preferably 2-6. The precursors are ideally prepared by halogenation of a magnesium and titanium containing compound or mixture. An especially desirable reaction medium comprises a mixture of an aromatic liquid, especially a chlorinated aromatic compound, most especially chlorobenzene, an alkanol, especially ethanol, and an inorganic chlorinating agent. Suitable inorganic chlorinating agents include chlorine derivatives of silicon, aluminum and titanium, especially titanium tetrachloride or aluminum sequichloride, most especially titanium tetrachloride.

In certain embodiments, the precursor comprises a composition of the formula: $[Mg(R^1OH)_r]_dTi(OR^e)_eX_f[ED]_q$, wherein $R^1OH$ is a monofunctional, linear or branched alcohol having between one and 25 carbon atoms; ED is an electron donor, especially a compound selected from the group consisting of alkyl esters of aliphatic and aromatic carboxylic acids, aliphatic ethers, cyclic ethers, and aliphatic ketones; q ranges from 0 to 50; r is 0, 1, or 2; and $R^e$, X, d, e, and f are as previously defined. Procatalyst compositions employed in the manufacture of propylene homopolymers or copolymers generally include an electron donor for purposes of controlling tacticity of the resulting polymer, and may differ in chemical composition from procatalysts used to prepare ethylene homopolymers or copolymers of ethylene and an α-olefin.

A preferred procatalyst composition for ethylene polymerizations comprises $TiCl_3$, formed by the reduction of $TiCl_4$ with magnesium metal in the presence of an electron donor. The electron donor employed in this embodiment of the invention must be free of substituents containing active hydrogen, such as hydroxyl groups, as such functional groups readily react with both magnesium and titanium tetrachloride. The reduction process results in the formation of a mixture of magnesium dichloride and titanium trichloride, in the form or a complex with the electron donor. This reaction can be illustrated by the following equation:

$$2TiCl_4(ED)_2 + Mg \rightarrow 2TiCl_3(ED)_3 + MgCl_2(ED)_{1.5},$$

where ED is a Lewis base electron donor, preferably tetrahydrofuran.

Because magnesium metal is highly reactive with titanium tetrachloride, it is preferable to employ the metal in the form of course granular rather than a powder in order to moderate the reaction rate. Magnesium particles having an average particle size of from 0.25 mm to 10 mm, preferably from 1 mm to 4 mm, are preferably employed. Desirably, one mole of magnesium metal for every two moles of titanium tetrachloride is employed in the reduction.

From 5 mols to 400 mols of electron donor compound are advantageously employed per mol of titanium tetrachloride, preferably 50 mols to 200 mols of electron donor compound per mol of titanium tetrachloride, with most of the excess being removed prior to or during spray-drying. Usually the magnesium metal is added to a mixture of titanium tetrachloride dissolved in the electron donor compound. However, it is also possible to add the titanium tetrachloride to a mixture of the magnesium metal in the electron donor compound, or even to add the titanium tetrachloride and magnesium metal to the electron donor compound together. Ordinarily reaction is effected below the boiling point of the electron donor compound, preferably between 20 and 70° C. An inert atmosphere should be maintained, that is, an atmosphere that is nonreactive under the conditions employed during the reduction.

The reduction of titanium tetrachloride with magnesium metal desirably results in formation of a solution containing one mole of magnesium dichloride for every two moles of titanium trichloride, and which is substantially free of undesirable by-products. Additional magnesium dichloride may be added to the solution to increase the Mg/Ti ratio, if desired. Highly desirably, sufficient magnesium dichloride is added to result in a Mg/Ti molar ratio from 1.5:1 to 15:1, most preferably from 4:1 to 6:1. Additional transition metal compounds such as those defined previously may be added as well. Additional electron donor compounds, especially those which may have reactive functionality towards either Mg metal or $TiCl_4$ may be added after the reduction is completed as well.

Additional components of the procatalyst composition may include fillers, binding agents, solvents, polymerization modifiers, and the aforementioned electron donor compounds. Typically a liquid mixture in which the magnesium halide composition is soluble is contacted with the filler, especially finely particulated, substantially spheroidal shaped silica. The term "substantially spheroidal" as used herein means particles having an average aspect ratio from 1.0 to 2.0, where aspect ratio is defined as the ratio of the largest linear dimension of a particle to the smallest linear dimension thereof as determined from Scanning Electron Micrograph (SEM) images. Preferred fillers have an average particle size ranging from 0.01 μm to 12 μm. Larger sized filler particles do not pack as densely as smaller particles leaving inter-particle voids in the resulting dried particles, in which the procatalyst composition and/or binders are inserted. A sufficient amount of procatalyst composition and optional binder should be used to fill any voids between filler particles, resulting in the formation of a relatively dense, tough and shatter resistant shell on the surface of the procatalyst particle.

The term "polymerization modifer" as used herein refers to a compound added to the procatalyst composition or to the polymerization mixture in order to modify one or more process or product properties. Examples include selectivity control agents used to modify tacticity and crystallinity of the polymer, as well as activity control agents added to reduce catalyst activity at elevated temperatures thereby preventing run away reactions or polymer agglomerate formation and operability problems.

The terms "$D_{10}$", "$D_{50}$" and "$D_{90}$" are employed to indicate the respective percentiles of log normal particle size distribution determined, for example, by means of an automated particle size analyzer, such as a Coulter™ brand particle analyzer, using dodecane solvent. Thus, particles having a $D_{50}$ of 12 μm have a median particle size of 12 μm. A $D_{90}$ of 18 μm indicates that 90 percent of the particles have a particle size of less than 18 μm, and a $D_{10}$ of 8 μm indicates that 10 percent of the particles have a particle size of less than 8 μm. The width or narrowness of a particle size distribution can be given by its span. The span is defined as $(D_{90}-D_{10})/(D_{50})$.

Suitable fillers are inert to the other components of the procatalyst composition, and to the active components employed in any subsequent polymerization. Suitable compounds can be organic or inorganic and include, but are not limited to, silicas, titanium dioxide, zinc oxide, magnesium carbonate, magnesium oxide, carbon, and calcium carbonate. In some embodiments, the filler is fumed hydrophobic silica that imparts relatively high viscosity to the slurry and good strength to the spray-dried particles. In other embodiments, two or more fillers may be used. Suitable fillers for use herein include those sold under the trade designation Gasil™, available from Ineos Corporation, and Cabosil™, available from Cabot Corporation.

Fillers for use herein may be porous and, if greater than 1 micrometer in particle size preferably are porous. Porosity of the filler may allow better diffusion of monomer into the interior of the procatalyst particle during polymerization. Preferred porous filler particles have a cumulative pore volume from 0.1 to 2.0 ml/g calculated by the B.E.T. technique according to ASTM Standard D3663-99. These preferred fillers are also characterized by a surface area ranging from 25 $m^2/g$ to 200 $m^2/g$, preferably from 50 $m^2/g$ to 100 $m^2/g$. Surface area may also be measured using the B.E.T. technique.

Non-porous fillers, such as fumed silicas, fumed aluminas, and fumed titanias are generally of very small particle size, typically with primary particle sizes less than 0.1 micrometers, although materials in the form of aggregates of the primary particle, may be employed as well.

Whatever the choice of filler, it should be dry, that is, free of absorbed water. Drying of the filler is carried out by heating it at a temperature below the sintering or melting point of the filler material for a suitable period, or the material, for example fumed silica, may, due to it's specific manufacturing method, be naturally low in residual moisture content. Typically, temperatures of at least 100° C. are used. Lower temperatures may be used where prolonged drying times are acceptable or where the support has a low melting or sintering temperature. Inorganic filler materials are typically dried at a temperature from 200 to 800° C. In addition, the filler material may be optionally treated with from 1 to 8 weight percent of one or more Lewis acids, such as aluminum trialkyl compounds or organosilane compounds, to remove polar impurities, including water or hydroxyl groups.

The filler is generally employed in an amount from 1 to 95 percent of the total procatalyst slurry composition weight. The quantity of filler employed is adjusted to produce a slurry of the desired viscosity for good spray drying operation. Preferably, the filler comprises from 10 to 98, preferably from 20 to 95, and most preferably from 25 to 90 percent of the dried procatalyst particle weight.

Exemplary equipment and techniques for spray drying have been previously disclosed in U.S. Pat. No. 4,293,673, U.S. Pat. No. 4,728,705, and U.S. Pat. No. 6,187,866, and elsewhere. According to the present invention however, the conditions used in the spray-drying process are critical to formation of the desired procatalyst particles. Generally, the spray-drying is typically accomplished by admixing a solution or slurry of the procatalyst with any filler, binder, selectivity control agent, polymerization modifier, or other component of the composition. The resulting mixture is then heated and atomized by means of a suitable atomizing device to form discrete droplets. Atomization is usually effected by passing the slurry through the atomizer together with an inert drying gas. An atomizing nozzle or a centrifugal high speed disc can be employed to effect atomization. The volumetric flow of drying gas is considerably higher than volumetric flow of the slurry to effect atomization of the slurry and removal of solvent or diluent and other volatile components. The drying gas should be nonreactive under the conditions employed during atomization. Suitable gases include nitrogen and argon. However, any other gas may be used so long as it is nonreactive and performs the desired drying of the procatalyst. Generally, the drying gas is also heated to facilitate rapid removal of diluent or solvent and solid particle formation. If the volumetric flow of drying gas is maintained at a very high level, it is possible to employ lower gas temperatures. The pressure of the drying gas is also adjusted to provide a suitable droplet size during this means of atomization. Suitable atomization nozzle pressures are from 1-200 psig (100–1500 kPa), preferably from 10 to 150 psig (170–1100 kPa). In centrifugal atomization, the atomizer wheel diameter is typically from 90 mm to 180 mm. Wheel speed is adjusted to control particle size. Typical wheel speeds are from 8,000 to 24,000 rpm, although higher or lower speed scan be used if needed to obtain the desired particle size.

FIG. 1 illustrates the effect of different droplet forming conditions (rotary atomizer versus nozzle or spray atomizer) in the spray-drying process. As FIG. 1 shows, smaller droplet size is generally attainable using a rotary atomizer. The present inventors have discovered that the concentration of magnesium component of the procatalyst composition in the slurry used to form the droplet in the spray-drying procedure as well as the drying conditions employed in forming particles from the atomized droplets are directly related to the morphology as well as the mechanical and chemical properties of the resulting spray-dried procatalyst composition. In particular, the strength and abrasion resistance of the resulting procatalyst particles is improved by the use of increased concentrations of magnesium compound in the procatalyst slurry used to prepare the particles preferably in combination with rapid drying conditions. It is believed that the use of increased concentrations of magnesium compound during droplet formation results in increased adhesion between filler particles as well as formation of a thicker and stronger, monolithic surface layer or shell. The resulting particles are better able to resist crumbling and breakage during formation, handling, and feeding operations. Additionally, the thicker, stronger shell results in a final activated catalyst particle that is more robust and less likely to fracture during the initial stages of the polymerization reaction. Both of these features are believed to contribute to reduced polymer fines generation.

By the term "substantially saturated" is meant that the magnesium compound, especially a magnesium halide compound, forms a solution in the diluent or solvent that is highly concentrated and may even exceed the normal solution concentration limits of the diluent or solvent at the temperature of the atomization. Super saturated solutions of the magnesium compound may arise due to the fact that solubility may decrease as temperature is increased so that upon heating of the slurry, the saturation threshold is exceeded. Due to the presence of fillers and other dissolved or other undissolved materials in the slurry; the use of elevated pressures, extreme mixing and turbulent flow conditions, and the brevity of the exposure to elevated temperatures, precipitation of the magnesium compound, if it occurs at all, is not detrimental to particle properties. Moreover, use of the foregoing concentrated slurry conditions and rapid drying conditions results in the formation of relatively robust, thick shelled, hollow particles, especially in the larger diameter ranges. Such particles are believed to be relatively immune to polymer fines generation and highly efficient, since catalyst material is concentrated on the surface of the particles and not isolated within the interior thereof.

Isolation of material in the interior of generally solid procatalyst particles is thought to be disadvantageous due to the fact that different diffusion velocities of different monomers can affect the monomer concentration available in the interior of the particle compared to the bulk monomer concentration. This in turn results in differences in the polymer formed by catalyst sites located in the interior of the particle as compared to the surface, especially when copolymers are prepared from mixtures of monomers. Moreover, another advantage to procatalysts comprising a relatively large percentage of hollow catalyst particles is that the polymerization is not characterized by lengthy induction periods or long decay profiles, again due to the fact that diffusion factors are significantly reduced.

Generally, feedstock slurries used to prepare the particles of the invention are from 50-150 percent, preferably from 80-125 percent of the saturation concentration of the magnesium compound, preferably the magnesium halide compound, most preferably magnesium dichloride, in the solvent or diluent at the temperature employed during the atomization. Highly desirably, the feedstock solutions are prepared and maintained prior to atomization at a concentration that is greater than 90 percent of the saturation concentration at that temperature.

When spray dried, such slurries produce discrete particles having at least some interior voids therein and a crust or exterior skin of the desired physical properties. In some embodiments the spray dried particles have smaller particles encapsulated within an outer shell or attached thereto and at times completely or nearly completely filling the interior of the resulting particles. Generally however, upon drying or removing the diluent or solvent, a portion of the interior volume of such particles is left relatively empty, thereby reducing the density of the resulting particles and improving catalyst efficiency. Although the surface of the particles is referred to as monolithic, it is to be understood that the crust or skin may include pores, ridges, crevices, fissures, or other discontinuities allowing communication with the interior of the particle without departing from the scope of the present invention. Preferably the relatively empty regions of the particle interior constituting the center half of the particle's interior volume comprise no more than 20 percent, more preferably no more than 10 percent, of the particle's mass.

One method for determining the thickness ratio in a spray-dried particle is to embed the particles in an inert matrix material such as polyethylene. The sample is then polished or sheared to expose a cross-section of representative particles. Any suitable form of microscopy may then be employed to visually determine the average thickness ratio of the particles.

The spray-dried particles are also characterized by their size distribution. In some embodiments, the spray-dried catalyst particles have a span less than 2.0, preferably less than 1.8. A narrower span has a smaller percentage of particles that may be too small or too large for a given application. The desirable span varies with the application.

In the operation of the invention the spray-dried procatalyst particles are combined with a cocatalyst to form the active catalyst composition. The activation may occur prior to or simultaneously with, or after contacting with the monomer or monomers to be polymerized. In a preferred embodiment, the procatalyst is partially or fully activated outside the polymerization reactor by contacting the same with a portion of the cocatalyst in an inert liquid hydrocarbon as disclosed in U.S. Pat. No. 6,187,866 or U.S. Pat. No. 6,617,405. After contacting the procatalyst composition with the cocatalyst, the hydrocarbon solvent may be removed by drying and the catalyst composition subsequently fed to the polymerization reactor where the activation is completed with additional amounts of the same or a different cocatalyst, if necessary.

The partially activated catalyst or the unactivated procatalyst composition and cocatalyst or additional quantities of cocatalyst are fed into the reactor or component structures thereof by the same or by separate feed lines. Desirably, the quantity of cocatalyst employed is sufficient to produce a molar ratio based on transition metal in the procatalyst from 1000:1 to 10:1. In multiple reactors operating in series, additional quantities of procatalyst, cocatalyst or both may be added to the second reactor, as desired to control polymerization conditions.

In some embodiments, catalysts prepared according to the present invention have improved productivity, especially when employed in a gas phase olefin polymerization process. It is to be understood that the catalysts described herein may be used in solution, slurry or gas-phase polymerizations. Suitable monomers for polymerization include $C_2$-$C_{20}$ olefins, diolefins, cycloolefins, and mixtures thereof. Especially suited are ethylene homopolymerization processes and copolymerizations of ethylene with $C_3$ to $C_8$ α-olefins, such as for example, 1-butene, 1-hexene, 4-methyl-1-pentene, and 1-octene.

In a continuous gas phase process, the partially or completely activated procatalyst composition is continuously fed to the reactor with discrete portions of any additional activator compound needed to complete the activation. The polymerization is generally conducted in a fluidized bed, in the absence of catalyst poisons such as moisture, oxygen, CO, $CO_2$, or acetylene in the presence of a catalytically effective amount of the catalyst composition at a temperature and at a pressure sufficient to initiate the polymerization reaction. Such processes are used commercially for the production of high density polyethylene (HDPE), medium density polyethylene (MDPE), and linear low density polyethylene (LLDPE) and are well known to the skilled artisan.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity. The formation of excess fines however, can upset control of bed height and cause operability problems in the reactor.

The molecular weight of polymers made by any suitable process is conveniently indicated using melt flow measurements. One such measurement is the melt index (MI or I2), obtained according to ASTM D-1238, Condition E, measured at 190° C. and an applied load of 2.16 kilogram (kg), reported as grams per 10 minutes. Some polymers prepared using some catalysts described herein have MI values ranging from 0.1 to 1000 grams/10 minutes. Melt flow rate (MFR or I21) is another method for characterizing polymers and is measured according to ASTM D-1238, Condition F, using 10 times the weight used in the melt index test above. The melt flow rate is inversely proportional to the molecular weight of the polymer. Thus, the higher the molecular weight, the lower the melt flow rate, although the relationship is not linear. The melt flow ratio (MFR) is the ratio of melt flow rate to the melt index. This correlates with the molecular weight distribution of the product polymer. Lower MFRs indicates narrower molecular weight distributions. Polymers prepared using some catalysts described herein have MFR values ranging from 20 to 40.

Average particle sizes are calculated from sieve analysis data according to ASTM D-1921, Method A, using a 500 g sample. Calculations are based on weight fractions retained on the screens. Bulk Density is determined according to ASTM D-1895, Method B by pouring the resin into a 100 ml graduated cylinder to the 100 ml line without shaking the cylinder, and weighed by difference.

Polymers may also be characterized by their density. Polymers herein may have a density of from 0.85 to 0.98 $g/cm^3$ as measured in a density gradient column in accordance with ASTM D-792 in which a plaque is made and conditioned for one hour at 100° C. to approach equilibrium crystallinity.

The following specific embodiments of the invention are especially desirable and hereby delineated in order to provide specific disclosure for the appended claims.

1. A Ziegler-Natta procatalyst composition in the form of solid particles and comprising magnesium, halide and transition metal moieties, said particles having an average size (D50) of from 10 to 70 µm, characterized in that at least 5 percent of the particles have internal void volume substantially or fully enclosed by a monolithic surface layer (shell), said layer being characterized by an average shell thickness/particle size ratio (Thickness Ratio) determined by SEM techniques for particles having particle size greater than 30 µm of greater than 0.2.

2. The composition according to embodiment 1 wherein the average particle size is from 20 to 35 µm.

3. The composition according to embodiment 1 wherein at least 25 percent of the particles have a Thickness Ratio of greater than 0.2.

4. The composition according to embodiment 2 wherein at least 25 percent of the particles have a Thickness Ratio of greater than 0.25.

5. The composition according to embodiment 1 wherein the procatalyst composition corresponds to the formula: $[Mg(R^1OH)_r]_d Ti(OR^e)_e X_f [ED]_q$, wherein $R^1OH$ comprises a monofunctional, linear or branched alcohol having between one and 25 carbon atoms; $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently R', chlorine, bromine or iodine; d is 0.5 to 5; e is 0-12; and f is 1-10, ED is an electron donor; q ranges from 0 to 50; and r is 0, 1, or 2.

6. The composition of embodiment 5 which is prepared by the reaction of magnesium dichloride with a titanium compound in the presence of an alcohol.

7. The composition of embodiment 6 wherein the transition metal compound is a titanium halide or a titanium haloalcoholate having 1 to 8 carbon atoms per alcoholate group.

8. The composition of embodiment 6 wherein the titanium compound is $TiCl_3$.

9. The composition of embodiment 1 additionally comprising a filler.

10. The composition of embodiment 9 wherein the filler is fumed silica present in the solid particles in an amount of at least 15 percent based on total composition weight.

11. A method for making the procatalyst composition of embodiment 1, the steps of the method comprising: a) providing a liquid composition comprising i) a magnesium halide compound, ii) a solvent or diluent, iii) a transition metal compound wherein the transition metal is selected from the metals of Groups 3-10 and Lanthanides of the Periodic Table of the Elements, iv) optionally an internal electron donor, and v) further optionally a filler; b) spray-drying the composition to form a spray-dried particle; and c) collecting the resulting solid particles, characterized in that the magnesium halide compound forms a substantially saturated solution in the solvent or diluent.

12. The method of embodiment 11 wherein the solvent or diluent is tetrahydrofuran.

13. The method of embodiment 11 wherein the magnesium halide compound is present in an amount that is at least 90 percent of the saturation concentration in the solvent or diluent.

14. A process for making a polymer comprising contacting at least one olefin monomer with a procatalyst according to any one of embodiments 1-10 or with a procatalyst made by the method of any one of embodiments 11-13, and a cocatalyst under olefin polymerization conditions to form a polymer product.

15. A process according to embodiment 14 wherein ethylene is homopolymerized or copolymerized with one or more α-olefins.

EXAMPLES

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis. The term "overnight", if used, refers to a time of approximately 16-18 hours, "room temperature", if used, refers to a temperature of 20-25° C., and "mixed alkanes" refers to a mixture of hydrogenated propylene oligomers, mostly $C_6$-$C_{12}$ isoalkanes, available commercially under the trademark Isopar E™ from Exxon-Mobil Chemicals, Inc.

Preparation of the Spray-Dried Procatalyst

A tetrahydrofuran slurry containing dissolved $MgCl_2$, a silane treated fumed silica filler (Cabosil™ TS-610 available from Cabot Corp.) and $TiCl_3$, (prepared substantially according to the teachings of U.S. Pat. No. 6,187,866) is spray-dried using an 8-foot diameter closed cycle spray dryer equipped with a rotary atomizer. The rotary atomizer speed is adjusted to produce particles with a substantially uniform particle size having a D50 of about 24 µm. Nitrogen gas is introduced into the spray dryer at inlet temperatures from 130-160° C. and circulated within the dryer at a rate of approximately 200-300 kg/hour. The slurry is fed to the spray dryer at a temperature of 35° C. and at a rate sufficient to yield an outlet gas temperature of approximately 115-120° C. The spray drying chamber pressure is maintained at a pressure slightly above atmospheric (5-7.5 Pa above atmospheric). A comparative procatalyst, is prepared using a procatalyst slurry having a lower concentration of $MgCl_2$ and using a lower orifice velocity, as indicated in Table 1. Both particles contain approximately 30 percent filler and are substantially spheroidally shaped.

TABLE 1

| | $MgCl_2$ concentration (g-moles/kg feed) | Orifice Velocity (cm/sec) | D10 | D50 | D90 |
|---|---|---|---|---|---|
| A* | 0.510 | 35 | 8.3 | 22.8 | 44.1 |
| Ex. 1 | 0.575 | 60 | 8.7 | 24.9 | 54.1 |
| Saturation | 0.62 | | | | |

*comparative, not an example of the invention

Figure 2:
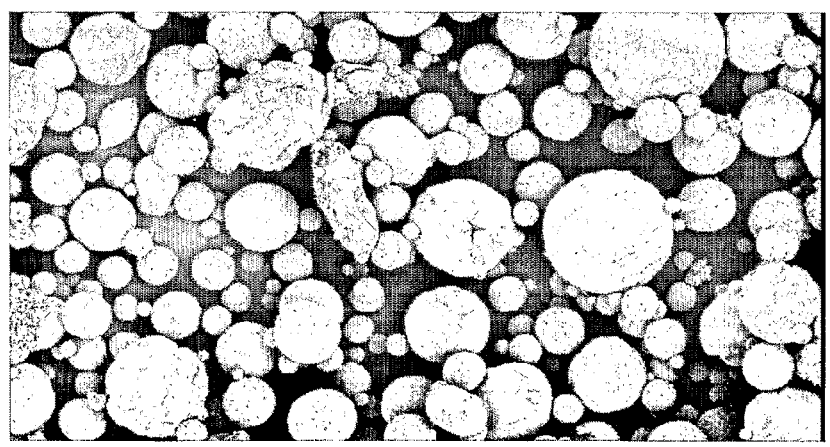
FIG. 2 is a scanning electron micrograph (SEM) of procatalyst particles of Example 1.
Figure 3:
FIG. 3 is a scanning electron micrograph (SEM) of microtomed procatalyst particles of Example 1.

As may be seen by comparison of the results indicated in Table 1, the procatalyst particles of the invention have an increased proportion of larger particles (>25 µm particle size) compared to the comparative catalyst. A SEM photograph of the particles prepared according to the invention is contained in FIG. 2. A SEM photograph of a microtomed sample illustrating the relatively large shell thickness ratio of larger particles in the invented procatalyst is contained in FIG. 3.

Gas-Phase Ethylene Homopolymerization

Twin fluidized bed, pilot scale, series polymerization reactors are used to prepare polyethylene homopolymers under the reaction conditions stated in Table 2. Under the conditions of operation, procatalyst and cocatalyst (triethylaluminum) are added under polymerization conditions to the first reactor and product is discharged into the second reactor and polymerization continued without additional quantities of catalyst or cocatalyst being added. The first reactor is operated under conditions of low ethylene concentration to produce a high molecular weight homopolymer product. The second reactor is operated under high hydrogen concentration to produce a low molecular weight polymer. These polymerization conditions favor excessive generation of resin fines. In fact, the comparative polymerization is prematurely terminated due to loss of fluidized bed level control. Results are shown in Table 2.

TABLE 2

| | Product Properties | | | |
|---|---|---|---|---|
| Process | Reactor 1 | Reactor 2 | Reactor 1 | Reactor 2 |
| Catalyst | Comp. A | | Ex. 1 | |
| Catalyst Amt. (cm³/hr) | 9.0 | | 9.0 | |
| Temperature (° C.) | 80.0 | 109.9 | 80.0 | 109.9 |
| Ethylene Partial Pressure (kPa) | 274 | 529 | 288 | 654 |
| $H_2/C_2$ Molar Ratio | 0.044 | 1.8 | 0.044 | 1.8 |
| Ethylene Mol Percent | 12.7 | 19.3 | 13.2 | 23.7 |
| Hydrogen Mol Percent | 0.6 | 34.8 | 0.6 | 42.7 |
| Isopentane Mol Percent | 6.2 | 0.3 | 6.2 | 0.3 |
| Nitrogen Mol Percent | 80.4 | 45.4 | 79.7 | 33.1 |
| Bed Weight (kg) | 28.4 | 37.1 | 28.5 | 34.2 |
| Residence Time (hr) | 2.0 | 1.60 | 1.8 | 1.38 |
| STY¹ (kg/hr/m³) | 0.042 | 0.060 | 0.053 | 0.070 |
| SGV² (m/sec) | 0.79 | 0.49 | 0.49 | 0.49 |
| Flow Index (I21, dg/min) | 0.22 | 4.3 | 0.21 | 6.0 |
| Melt Index (I2, dg/min) | — | 0.04 | — | 0.05 |
| Density (g/cm³) | 0.9462 | 0.9616 | 0.9465 | 0.9626 |
| Titanium (ppmw) | 5.9 | 3.3 | 4.5 | 2.4 |
| Aluminum (ppmw) | 132.1 | 79.5 | 136.7 | 76.5 |
| Al/Ti | 39.9 | 43.5 | 53.5 | 57.0 |
| Bulk Density (kg/m³) | 0.365 | 0.399 | 0.337 | 0.374 |
| Average Particle Size (D50, mm) | 0.610 | 0.610 | 0.838 | 0.813 |
| Sieve Results³ | | | | |
| ≥2.0 mm | 13.7 | 15.2 | 33.9 | 31.80 |
| ≥1.0, <2.0 mm | 37.0 | 35.1 | 36.9 | 35.2 |
| ≥0.5, <1.0 mm | 36.6 | 34.4 | 23.3 | 24.3 |
| ≥0.25, <0.5 mm | 10.6 | 11.5 | 5.0 | 6.9 |
| ≥0.125, <0.25 mm | 1.6 | 3.2 | 0.6 | 1.5 |
| <0.125 mm | 0.5 | 0.7 | 0.2 | 0.3 |

¹Space time yield
²Superficial Gas Velocity
³Percent product having particle size in indicated range As may be seen by reference to the sieve results of Table 2, the polymer product produced with the procatalyst of the invention has greatly reduced fine particle generation. In particular, generation of particles of sieve dimension less than 0.25 mm (fines) is reduced by over 50 percent using the procatalysts of the invention.

The invention claimed is:

1. A Ziegler-Natta procatalyst composition comprising: a spray drying products of a liquid composition comprising reduced titanium tetrachloride with magnesium metal in the presence of a Lewis base electron donor free of substituents containing active hydrogen as the sole electron donor; wherein the spray drying products of the liquid composition are solid particles, characterized in that the concentration of a magnesium chloride in the spray dried liquid composition is greater than 90 percent of the saturation concentration of the magnesium chloride at the temperature of the atomization; and wherein said Ziegler-Natta procatalyst composition is in the form of solid particles and comprising magnesium chloride and transition metal moieties, said particles having an average size (D50) of from 10 to 70 µm and comprising at least 5 percent of the particles having internal void volume substantially or fully enclosed by a monolithic surface layer (shell), said layer having an average shell thickness/particle size ratio (Thickness Ratio) determined by Scanning Electron Micrograph (SEM) techniques for particles having particle size greater than 30 µM of greater than 0.2.

2. The Ziegler-Natta procatalyst composition of claim 1, wherein the Lewis base electron donor is tetrahydrofuran.

3. The Ziegler-Natta procatalyst composition of claim 1, wherein the spray dried liquid composition comprises a filler.

4. The Ziegler-Natta procatalyst composition of claim 3, wherein the filler is silica particles having an average aspect ratio from 1.0 to 2.0, where aspect ratio is the ratio of the largest linear dimension of a particle to the smallest linear dimension thereof as determined from SEM images, and an average particle size ranging from 0.01 μm to 12 μm.

5. The Ziegler-Natta procatalyst composition of claim 1, wherein the magnesium metal is in the form of particles having an average particle size of from 0.25 mm to 10 mm.

6. The Ziegler-Natta procatalyst composition of claim 1, wherein one mole of magnesium metal for every two moles of titanium tetrachloride is employed in the reduction.

7. The Ziegler-Natta procatalyst composition claim 1, wherein 5 mols to 400 mols of electron donor compound are employed per mol of titanium tetrachloride, with most of the excess being removed prior to or during spray-drying.

8. The Ziegler-Natta procatalyst composition of claim 1, wherein the reduction of titanium tetrachloride with magnesium metal results in formation of a solution containing one mole of magnesium dichloride for every two moles of titanium trichloride, and which is substantially free of undesirable by-products.

9. The Ziegler-Natta procatalyst composition of claim 1, wherein additional magnesium dichloride is added to the solution to increase the Mg/Ti ratio.

10. The Ziegler-Natta procatalyst composition of claim 1, where sufficient magnesium dichloride is added to result in a Mg/Ti molar ratio from 1.5:1 to 15:1.

11. The Ziegler-Natta procatalyst composition according to claim 1, wherein the average particle size of the procatalyst composition is from 20 to 35 μm.

12. The Ziegler-Natta procatalyst composition according to claim 1, wherein at least 25 percent of the particles of the procatalyst composition have a Thickness Ratio of greater than 0.2.

13. The Ziegler-Natta procatalyst composition according to claim 12, wherein at least 25 percent of the particles of the procatalyst composition have a Thickness Ratio of greater than 0.25.

* * * * *